US012705888B2

(12) United States Patent
Thyagharajan et al.

(10) Patent No.: US 12,705,888 B2
(45) Date of Patent: Aug. 11, 2026

(54) SEGMENT FUSION BASED ROBUST SEMANTIC SEGMENTATION OF SCENES USING A GRAPH CLUSTERER

(71) Applicant: Intel Corporation, Santa Clara, CA (US)

(72) Inventors: Anirud Thyagharajan, Bengaluru (IN); Prashant Laddha, Bengaluru (IN); Benjamin Ummenhofer, Unterhaching (DE); Om Ji Omer, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 17/582,390

(22) Filed: Jan. 24, 2022

(65) Prior Publication Data

US 2022/0148311 A1 May 12, 2022

(51) Int. Cl.
*G06V 20/40* (2022.01)
*G06V 10/764* (2022.01)
*G06V 10/80* (2022.01)

(52) U.S. Cl.
CPC ............ *G06V 20/41* (2022.01); *G06V 10/764* (2022.01); *G06V 10/809* (2022.01)

(58) Field of Classification Search
None
See application file for complete search history.

(56) References Cited

U.S. PATENT DOCUMENTS

| | | | | |
|---|---|---|---|---|
| 11,533,495 B2 * | 12/2022 | Jain | H04N 19/136 |
| 11,694,301 B2 * | 7/2023 | Nie | G06N 5/046 382/100 |
| 11,816,841 B2 * | 11/2023 | Cheng | G06V 10/26 |
| 11,847,811 B1 * | 12/2023 | Zhang | G06V 10/267 |
| 2018/0165554 A1 * | 6/2018 | Zhang | G06F 18/214 |
| 2022/0101489 A1 * | 3/2022 | Nie | G06V 10/82 |
| 2022/0148311 A1 * | 5/2022 | Thyagharajan | G06V 20/41 |
| 2022/0256175 A1 * | 8/2022 | Jain | G06N 3/09 |
| 2022/0301173 A1 * | 9/2022 | Cheng | G06F 18/22 |
| 2025/0016192 A1 * | 1/2025 | Montgomery | H04L 63/1441 |

OTHER PUBLICATIONS

I. Armeni et al., “Joint 2D-3D-Semantic Data for Indoor Scene Understanding,” <arxiv.org/pdf/1702.01105.pdf>, Apr. 6, 2017, 9 pages.
S. Chen et al., “Hierarchical Aggregation for 3D Instance Segmentation,” <arxiv.org/pdf/2108.02350.pdf>, Aug. 5, 2021, 12 pages.
C. Choy et al., “4D Spatio-Temporal Convnets: Minkowski Convolutional Neural Networks,” <arxiv.org/pdf/1904.08755.pdf>, Jun. 13, 2019, 21 pages.

(Continued)

*Primary Examiner* — Tahmina N Ansari
(74) *Attorney, Agent, or Firm* — Nicholson De Vos Webster & Elliott LLP

(57) ABSTRACT

Systems, apparatuses and methods may provide for technology that identifies a plurality of segments based on semantic features and instance features associated with a scene, fuses the plurality of segments into a plurality of instances, and selects classification labels for the plurality of instances. In one example, the plurality of segments is fused into the plurality of instances via a learnable self-attention based network.

22 Claims, 7 Drawing Sheets

(56) References Cited

OTHER PUBLICATIONS

T. Cormen et al., "Introduction to Algorithms," Chapter 21, The MIT Press, McGraw-Hill Book Company, 1990, 59 pages.

A. Dai et al., "Scannet: Richly-Annotated 3D Reconstructions of Indoor Scenes," <arxiv.org/pdf/1702.04405.pdf>, Apr. 11, 2017, 22 pages.

K. Derpanis et al., "Mean Shift Clustering," Lecture Notes, <www.cse.yorku.ca/~kosta/CompVis_Notes/mean_shift.pdf>, Aug. 15, 2005, 4 pages.

F. Engelmann et al., "3D-MPA: Multi-Proposal Aggregation for 3D Semantic Instance Segmentation," <arxiv.org/pdf/2003.13867.pdf>, Mar. 30, 2020, 10 pages.

P.F. Felzenswalb et al., "Efficient Graph-Based Image Segmentation," International Journal of Computer Vision, kcs.brown.edu/people/pfelzens/papers/seg-ijcv.pdf>, International Journal of Computer Vision, 59(2), 2004, 26 pages.

B. Graham et al., "3D Semantic Segmentation with Submanifold Sparse Convolutional Networks," <arxiv.org/pdf/1711.10275.pdf>, Nov. 28, 2017, 11 pages.

L. Han et al., "Occuseg: Occupancy-Aware 3D Instance Segmentation," <arxiv.org/pdf/2003.06537.pdf>, Apr. 28, 2020, 12 pages.

J. Hou et al., "3D-SIS: 3D Semantic Instance Segmentation of RGB-D Scans," <arxiv.org/pdf/1812.07003.pdf>, Apr. 29, 2019, 14 pages.

L. Jiang et al., "Pointgroup: Dual-Set Point Grouping for 3D Instance Segmentation," <arxiv.org/pdf/2004.01658.pdf>, Apr. 3, 2020, 10 pages.

Z. Liang et al., "Instance Segmentation in 3D Scenes using Semantic Superpoint Tree Networks," <arxiv.org/pdf/2108.07478.pdf>, Aug. 17, 2021, 10 pages.

Q. Pham et al., "JSIS3D: Joint Semantic-Instance Segmentation of 3D Point Clouds with Multi-Task Pointwise Networks and Multi-Value Conditional Random Fields," <arxiv.org/pdf/1904.00699.pdf>, Apr. 5, 2019, 10 pages.

C. Qi et al., "Pointnet: Deep Learning on Point Sets for 3D Classification and Segmentation," <arxiv.org/pdf/1612.00593.pdf>, Apr. 10, 2017, 19 pages.

C. Qi et al., "PointNet++:Deep Hierarchical Feature Learning on Point Sets in a Metric Space," <arxiv.org/pdf/1706.02413.pdf>, Jun. 7, 2017, 14 pages.

C. Qi et al., "Deep Hough Voting for 3D Object Detection in Point Clouds," <arxiv.org/pdf/1702.01105.pdf>, Aug. 22, 2019, 14 pages.

E. Shubert et al., "DBSCAN Revisited, Revisited: Why and How You Should (Still) Use DBSCAN," 2017, <ccs.neu.edu/home/vip/teach/DMcourse/2_cluster_EM_mixt/notes_slides/revisitofrevisitDBSCAN.pdf>, ACM Transactions on Database Systems (TODS), 42(3), 21 pages.

A. Vaswani et al., "Attention Is All You Need," 2017, <proceedings.neurips.cc/paper/2017/file/3f5ee243547dee91fbd053c1c4a845aa-Paper.pdf>, 11 pages.

P. Velickovic et al., "Graph Attention Networks," <arxiv.org/pdf/1710.10903.pdf>, Feb. 4, 2018, 12 pages.

W. Wang et al., "SGPN: Similarity Group Proposal Network for 3D Point Cloud Instance Segmentation," <arxiv.org/pdf/1711.08588.pdf>, May 30, 2019, 13 pages.

K. Wang et al., "Associatively Segmenting Instances and Semantics in Point Clouds," <arxiv.org/pdf/1902.09852.pdf>, Feb. 28, 2019, 10 pages.

W. Wu et al., "Pointconv: Deep Convolutional Networks on 3D Point Clouds," <arxiv.org/pdf/1811.07246.pdf>, Nov. 9, 2020, 10 pages.

Y. Wu etal., "Group Normalization," <arxiv.org/pdf/1803.08494.pdf>, Jun. 11, 2018, 10 pages.

* cited by examiner

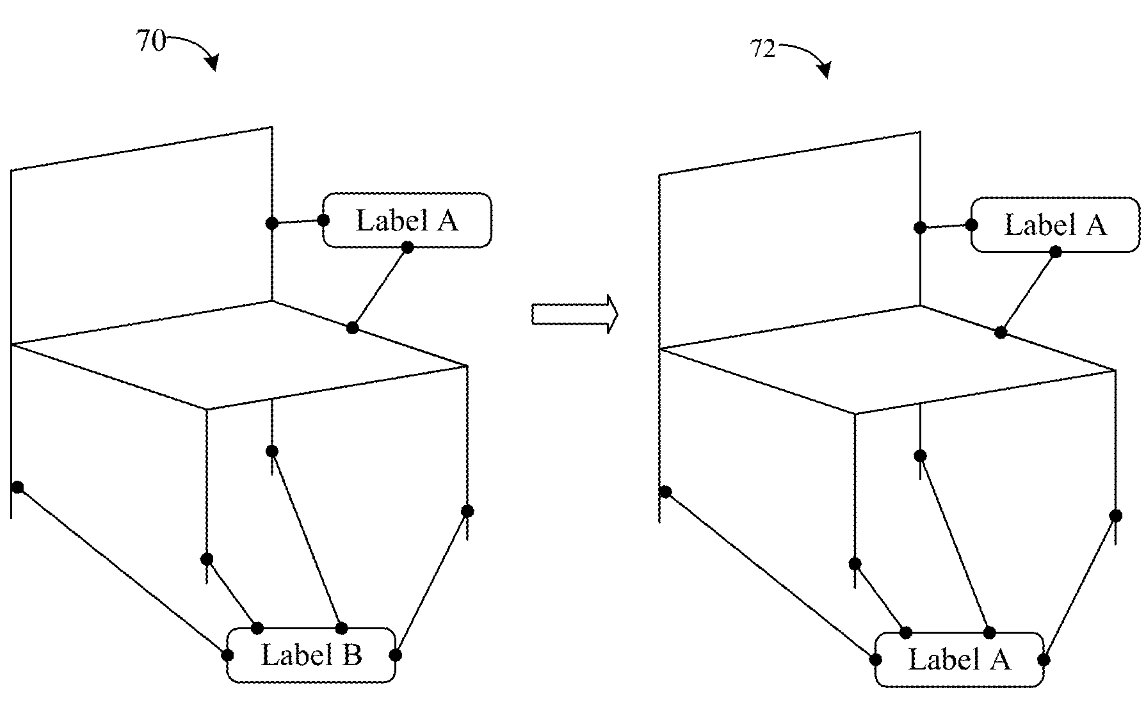
FIG. 5
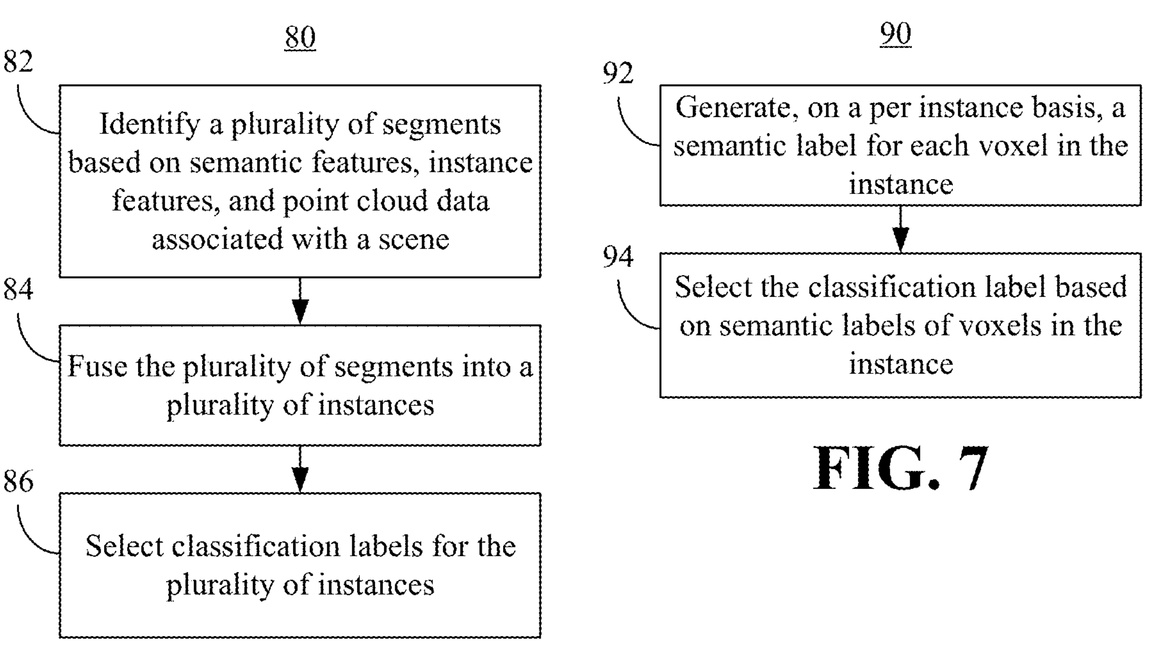
FIG. 6
FIG. 7

1000
Processing Element
1070
1896a
Proc.
Core
1074b
1074a
Memory
1032
MC
1072
1076
1078
P-P
P-P
1050
Processing Element
1080
1896b
Proc.
Core
1084b
1084a
1088
1086
MC
1082
P-P
P-P
Memory
1034
Battery
1010
1094
P-P
IO Subsystem
1090
P-P
1098
1049
High-Perf.
Graphics
1038
I/F
I/F
1092
1096
1016
Bus Bridge
1018
IO Devices
1014
Audio IO
1024
1020
Keyboard/Mouse
1012
Comm. Devices
1026
1030
Data Storage
Code
1019

SEGMENT FUSION BASED ROBUST SEMANTIC SEGMENTATION OF SCENES USING A GRAPH CLUSTERER

TECHNICAL FIELD

Embodiments generally relate to scene segmentation. More particularly, embodiments relate to segment fusion based robust semantic segmentation of scenes.

BACKGROUND OF THE DISCLOSURE

Three-dimensional (3D) semantic segmentation typically involves labeling each point in 3D point cloud data with a classification attribute (e.g., chair, table, etc.), where the semantic segmentation task may be useful in various applications such as autonomous driving, robotics, and indoor scene understanding. Conventional semantic segmentation solutions, however, may partially misclassify objects, involve complex and heuristic-driven post-processing, be limited to specific models, networks and/or scenes and/or focus solely on the strongest clues in the scene.

BRIEF DESCRIPTION OF THE DRAWINGS

The various advantages of the embodiments will become apparent to one skilled in the art by reading the following specification and appended claims, and by referencing the following drawings, in which:

FIG. 5 is a comparative illustration of an example of a conventional classification result and an enhanced classification result according to an embodiment;

FIG. 6 is a flowchart of an example of a method of segmenting a scene according to an embodiment;

FIG. 7 is a flowchart of an example of a method of selecting classification labels for a plurality of instances according to an embodiment;

DETAILED DESCRIPTION

Figure 1:
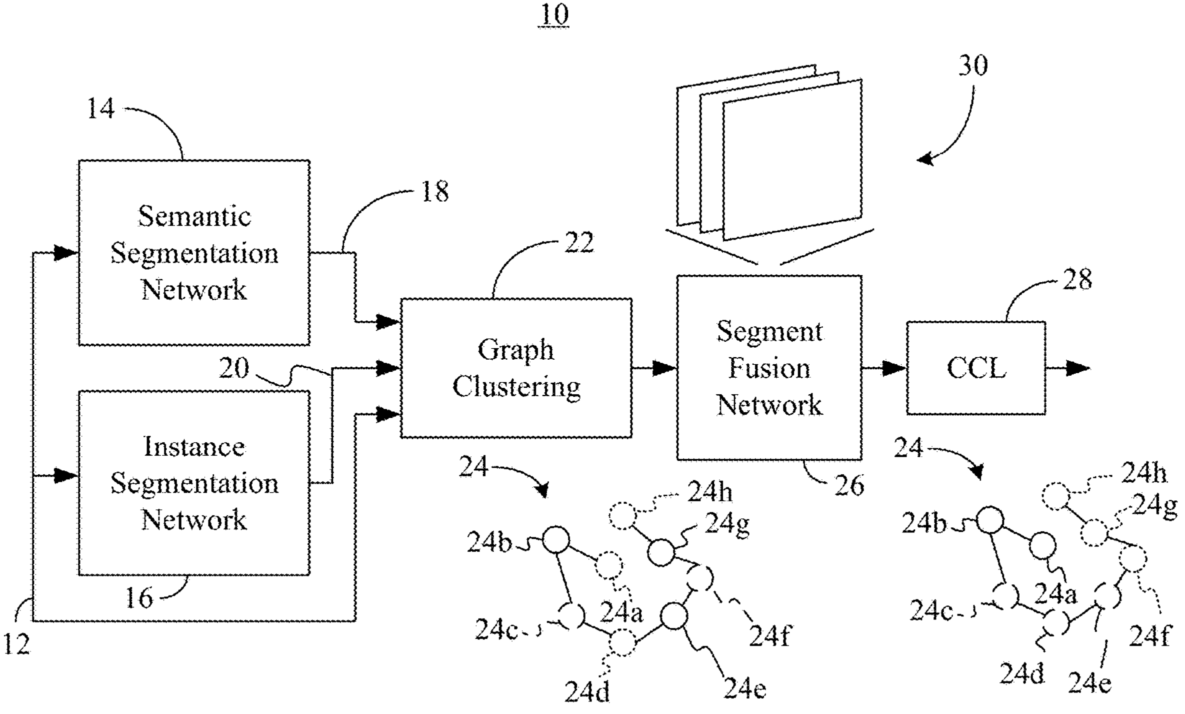
FIG. 1 is a block diagram of an example of a segmentation pipeline according to an embodiment.

Previous scene segmentation solutions can be classified into two-dimensional (2D, e.g., working on 2D projected data) solutions and 3D solutions (e.g., working on 3D data). Additionally, 3D processing solutions can be broadly categorized into point-based solutions and voxel-based solutions.

Point-based solutions may employ a series of multi-layer perceptron blocks (MLPs) to process the information and employ global pooling strategies, whereas voxel-based solutions may employ U-Nets, which are a stack of sparse convolutional layers, along with downsampling and upsampling layers, working on voxelizing the coordinates into discrete locations.

Basic semantic segmentation networks may suffer from noticeable misclassifications within parts of objects. This misclassification is primarily due to challenges encountered in capturing and fusing different types of contextual information at an appropriate level of granularity (e.g., local to global understanding: moving from points to instances to scenes).

Previous approaches to improving semantic segmentation performance may include using instance segmentation to comprehend object boundaries of a single instance of the object, attempting to fuse semantic and instance information to enable better semantic segmentation. Most of these approaches, however, operate on fusing features at the points level and are therefore inefficient. Approaches that hierarchically fuse features are iterative and non-learnable and involve computationally expensive post-processing.

Technology described herein provides a hierarchical and learnable self-attention based fusion of semantic and instance features aimed at improving semantic segmentation performance of datasets of arbitrary size, with minimal post-processing. Moreover, embodiments demonstrate improvement in semantic segmentation performance for multiple generic semantic backbone networks.

More particularly, embodiments provide an attention-based solution to hierarchical fusion of semantic and instance information at an appropriate level of granularity of context (e.g., local to global scale) to address the issue of partial misclassifications. The technology described herein exploits geometric smoothness priors (e.g., assuming that physical properties in a neighborhood of space or in an interval of time present some coherence and generally do not change abruptly) for clustering features at a finer granularity of voxels (e.g., a "segment") and then uses a learnable attention-based network to hierarchically fuse the segments based on their respective semantic and instance features (e.g., implemented in a segment fusion network). The technology described herein involves minimal postprocessing, including a simple yet effective connected component labelling (CCL) solution to fuse segments into instances.

Embodiments include a hierarchical learnable two-fold strategy: (i) use a graph clustering solution relying on geometric smoothness priors to achieve an over-segmented clustering of a point cloud, and compute representative semantic and instance features per segment and (ii) feed the set of segments to a segment fusion network that computes similarities between the segments and merges some of these segments into instances, where the instances undergo a soft majority voting over their respective semantic labels to semantically label every voxel in the instance.

FIG. 1 shows a segmentation pipeline 10 in which input data 12 (e.g., including point data, color data, etc.) associated with a scene is provided to a semantic segmentation network 14 and an instance segmentation network 16. The semantic segmentation network 14 generates semantic features 18 and the instance segmentation network 16 generates instance features 20. In one example, the semantic features 18 are extracted from the penultimate layer of a model (e.g., right before the transformation of features to discrete classes) that has been trained for the task of semantic segmentation. Features of the points/surfaces belonging to the same class (e.g., chair) are likely to be closer to one another in feature space (e.g., even though they can refer to two instances of the same class in a scene). The instance features 20 may be extracted from the penultimate layer of a model (e.g., right before the transformation of features to discrete classes) that has been trained for the task of instance segmentation. Features of the points/surfaces belonging to the same instance (e.g., chair-1) are likely to be closer to one another in feature space. Additionally, these features are likely to be distinctive as compared to other instances (e.g., chair-2, wall-1, etc.). In one example, the input data 12 is point cloud data containing any attributes associated with a point cloud, including point locations (e.g., coordinates), colors (e.g., texture information), per-point normals, and any other photometric/geometric features associated with a point cloud. The input data 12 may also include any point cloud shape descriptors.

In an embodiment, a graph clustering stage 22 identifies a plurality of segments 24 (24*a*-24*h*) based on the semantic features 18, the instance features 20, and the input data 12. In an embodiment, the plurality of segments 24 is variable in size. Thus, the number of segments 24 is not fixed. Additionally, a segment fusion network 26 fuses the plurality of segments 24 into a plurality of instances, wherein a CCL stage 28 selects classification labels for the plurality of instances. More particularly, the segment-fusion network 26 transforms the features of segments by ensuring that those which are part of the same object are closer in space. Moreover, the CCL stage 28 transforms these features into classification labels. In one example, the segment fusion network 26 includes a set of multi-head attention encoder stacks 30.

Figure 2:
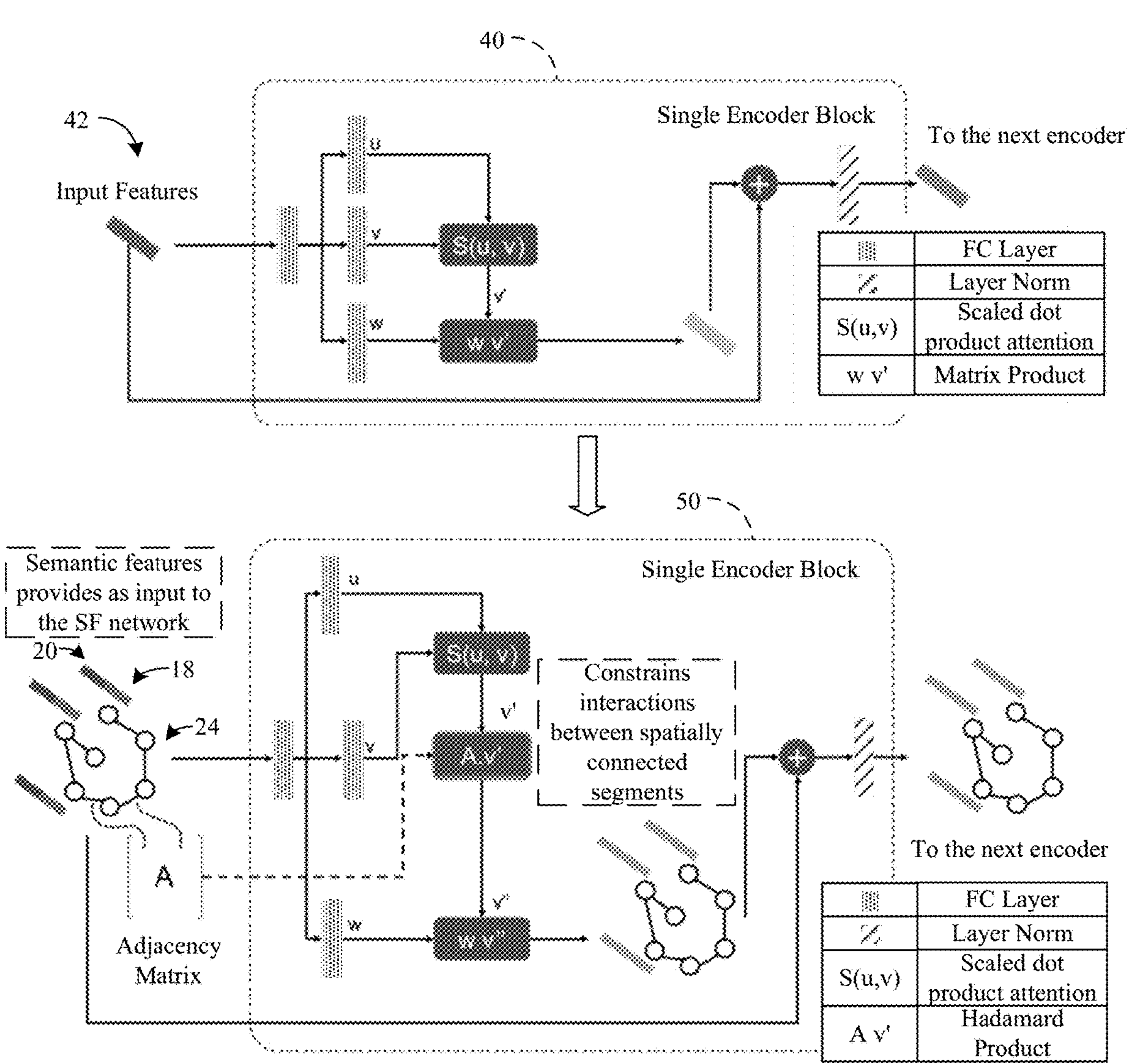
FIG. 2 is a comparative block diagram of an example of a conventional encoder block and an enhanced encoder block according to an embodiment.

FIG. 2 demonstrates that a conventional encoder block 40 of a transformer may operate on input features 42. More particularly, an initial fully connected (FC) layer processes the input features 42 and provides an output to a "u" FC layer, a "v" FC layer, and a "w" FC layer. A scaled dot product attention is applied to the output of the u and v FC layers, and a matrix product is applied to the outputs of the scaled dot product attention and the w FC layer. The result is summed with the original input features 42, with the summation result being processed by a normalization layer. The output of the normalization layer is provided to the next encoder.

By contrast, an enhanced encoder block 50 operates on the plurality of segments 24, which are generated based on both the semantic features 18 and the instance features 20. The illustrated enhanced encoder block 50 is merely an example of a network architecture. The technology described herein may be applied to other network architectures as well. In the illustrated example, an initial FC layer processes the plurality of segments 24 and provides an output to a "u" FC layer, a "v" FC layer, and a "w" FC layer. A scaled dot product attention is applied to the output of the u and v FC layers, and a Hadamard product (e.g., element-wise multiplier) is applied to the output of the scaled dot product attention and an adjacency matrix associated with the plurality of segments 24. In an embodiment, the Hadamard product constrains interactions between spatially connected segments in the plurality of segments 24. In one example, a matrix product is applied to the outputs of the Hadamard product and the w FC layer. The result is summed with the original plurality of segments 24, with the summation result being processed by a normalization layer. The output of the normalization layer is provided to the next encoder.

Thus, the enhanced encoder block 50 provides a segment-Fusion, learnable self-attention-based network that aims to fuse or separate segments based on the similarity in their respective features. Through this approach, the segment-Fusion network determines the appropriate granularity of context. Segments that are pooled up become an instance, which undergoes a "soft" majority voting over semantic labels. The soft majority voting results are used to semantically label every voxel in the instance.

More particularly, the usage of per segment semantic features 18, in addition to the instance features 20, in the segment fusion network enables the network to understand and account for incorrect semantic predictions while predicting segment fusion decisions. The semantic features 18 are fed through the encoder blocks 50 of the segment fusion network. An element-wise multiplication is conducted after the scaled dot product attention phase in each encoder block 50, where the attention matrix is multiplied with the adjacency matrix of the segment graph (see, Equation 3 below). This approach helps to constrain the interactions only between those segment pairs that are spatially connected.

At the end of the network, segment similarities are computed by calculating the Euclidean distance between the segment features (see, Equation 8 below). If the distance between two segments is below the threshold, then the two segments are considered similar. Otherwise, the segments are treated as dissimilar. Similar segments that are spatially connected to one another are identified and grouped together via a CCL stage, with each group being identified as an instance.

Finally, a soft majority vote is employed over the semantic predictions of the voxels in the instance. In one example, the soft majority is determined through a sum of class probabilities. In such a case, the majority label is chosen as the label for all voxels belonging to that instance.

Figure 3:
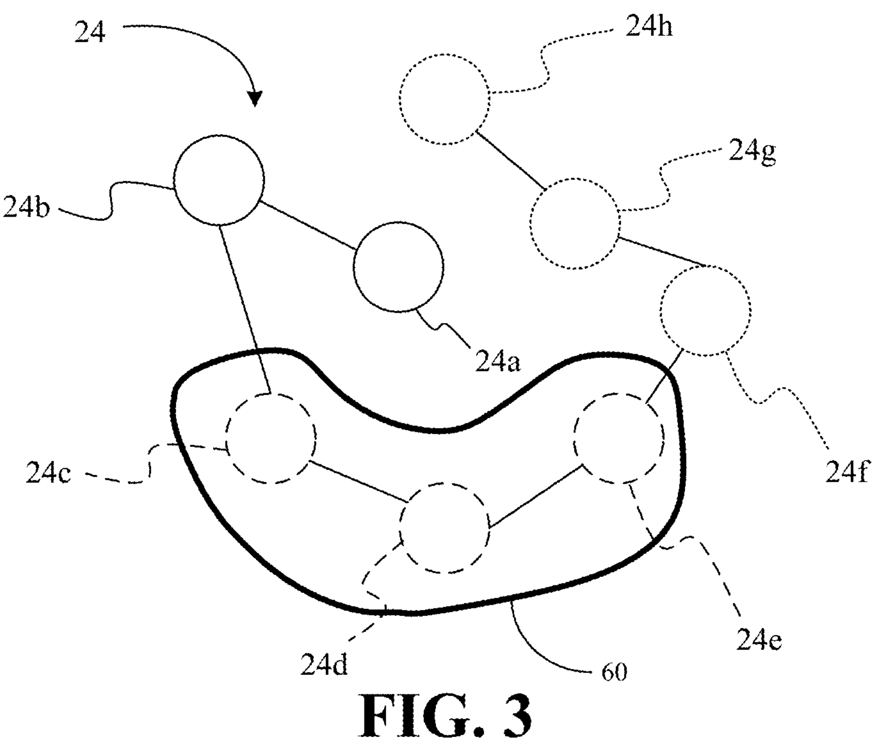
FIG. 3 is an illustration of an example of the application of an instance loss function to segments according to an embodiment.
Figure 4:
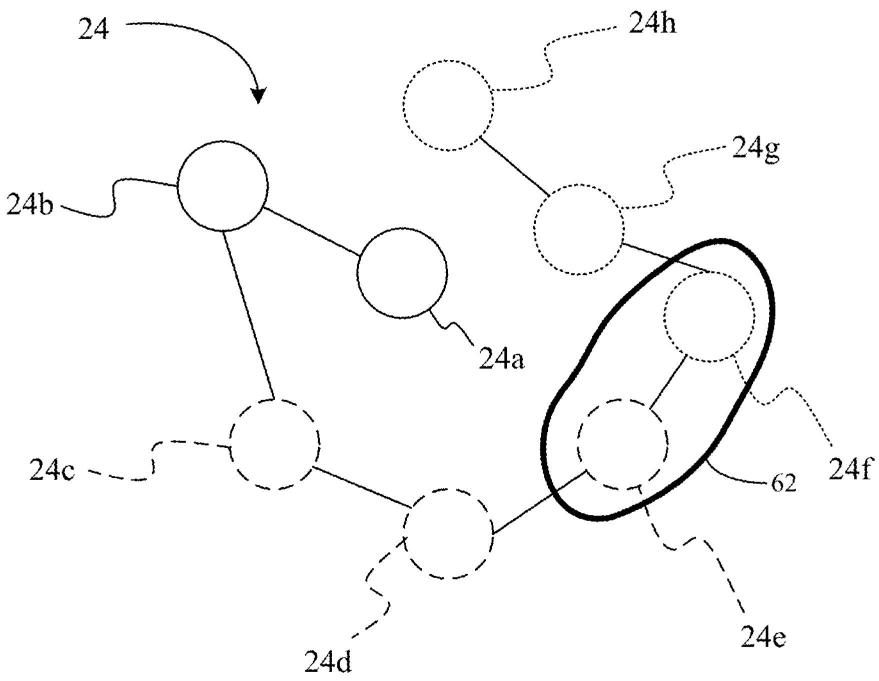
FIG. 4 is an illustration of an example of the application of a segment loss function to segment pairs according to an embodiment.

Turning now to FIGS. 3 and 4, embodiments use a combination of loss functions, including segment losses, to supervise the segment fusion network to fuse or keep separate any two spatially adjacent segments.

As best shown in FIG. 3, the instance loss optimizes segments corresponding to the same instance 60. Although previous approaches may have proposed losses at the points level, the technology described herein determines losses at the level of graph nodes (e.g., segments), with tied threshold parameters. The threshold parameters aim to (a) minimize the intra-instance segment feature distance, (b) maximize the inter-instance centroid feature distance, where the centroid features are computed for all the segments belonging to the same ground truth instance, (c) and regularize the result. More particularly, the loss of the instance 60 may be represented as $L_{instance}$.

As best shown in FIG. 4, the segment loss optimizes pairwise losses between a pair 62 of segments. Embodiments include loss functions that penalize edges where the model mispredicts either a fusion or a separation decision. The fusion or separation decision is determined by thresholding the distance between pairs of segment features. This approach enables simpler post-processing to cluster segments together.

Point-wise features may be denoted by X and segment-wise features may be denoted by $\overline{X}$.

Semantic Loss

Per-point semantic features may be denoted by S, and the locations of points may be denoted by P.

Instance Loss

In one example, the instance network outputs two features—instance embeddings and spatial embeddings. Per-point instance features may be denoted by I and per-point instance centroid estimates may be denoted by D.

Graph Segmentation

As already noted, using pixel-wise predictions for semantic segmentation results in the misclassification of parts of objects. Accordingly, technology described herein provides an understanding of the objects to which the points are attached. More particularly, embodiments provide a hierarchical strategy, segmenting voxels into 3D surfaces (e.g., segments or super-voxels) using efficient graph segmentation technology.

The graph segmentation stage provides over-segmented classification boundaries that do not violate object boundaries, in the sense that two voxels pertaining to two different objects always end up in different segments (e.g., essentially because objects are composed of a complex collection of 3D surfaces). Representations in higher-level abstractions such as segments offer geometric continuity, particularly since the representations provide guarantees that the point normals in a segment vary only within a bound.

The output of the graph segmentation stage may be a list of sets of voxels J, each set $J_i$ pertaining to voxels within a segment. Using an averaging strategy across the per-point features (S,D,I), per-segment features ($\overline{S},\overline{D},\overline{I}$) may be computed according to:

$$\overline{X}_i = \frac{1}{|J_i|}\sum_{j\in J_i} X_j \quad \text{Equation 1}$$

While running the graph segmentation stage, the adjacency information between segments is also recorded. This approach enables the connectivity of the segments, represented by an adjacency matrix A, to be understood. A graph of segments G=(V,E) is formed, where V pertains to the list of segments (e.g., forming the vertices of the graph) and E refers to the graph described by A.

Segment Fusion

Having formed segments out of the underlying points, embodiments then form objects out of these segments. To this effect, a network is trained to jointly associate the instance-level with the semantic-level information and essentially form decisions as to whether a pair of segments belong to the same object (fusable) or do not belong to the same object (separable). To supervise this learning process, embodiments employ two sets of losses—(i) instance losses and (ii) segment losses. Thus, the overall loss function is:

$$L_{SF}=L_{instance}+L_{segment} \quad \text{Equation 1}$$

The instance and semantic features are projected per segment $\{\overline{S},\overline{D},\overline{I}\}$ and transformed to a set of features $\overline{F}$ in the joint semantic-instance space using the segment fusion network.

Segment-Fusion Network

The technology described herein uses a learnable network to predict and fuse similar segments. The network described herein is only an example of such a learnable network.

In one example, the network is composed of multiple stacks of encoder blocks, where each encoder block conducts transformer-like operations, involving transformations and self-attention. The network is composed of attention blocks, where the segment features are linearly transformed (e.g., with non-linear activation layers interspersed) and self-attention is used to compare segment features with one another. Embodiments multiply the self-attention [S(u, v)] with the adjacency matrix [A] to constrain spatial interactions (e.g., Hadamard product). Group-normalization is used to normalize the channels and employ residual connections across the blocks to improve gradient flow.

$$v''=A\cdot S(u,v) \quad \text{Equation 2}$$

Any network architecture employing self-attention may be used, augmented with elementwise multiplication with the adjacency matrix. Examples include Graph Attention Networks (GAT), Transformers, and so forth.

Segment Fusion (SF)—Instance Loss

In one example, attraction and repulsion instance losses are used at the segment level. These losses ensure that segments of the same instance are clustered together, whereas the centroids of the instance features are repelled from one another.

$$L_{instance} = L_{attract} + L_{repel} + L_{reg} \quad \text{Equation 3}$$

$$L_{attract} = \frac{1}{K}\sum_{i=1}^{K}\frac{1}{N_i}\sum_{j=1}^{N_i}\left(d(\overline{F}_j, \mu_i) - \Delta_D\right)_+ \quad \text{Equation 4}$$

$$L_{repel} = \frac{1}{K(K-1)}\sum_{i=1}^{K}\sum_{j=1;i\neq j}^{K}\left(\beta\Delta_D - d(\mu_i, \mu_j)\right)_+^2 \quad \text{Equation 5}$$

$$L_{reg} = \frac{1}{K}\sum_{i=1}^{K}\|\mu_i\|_1 \quad \text{Equation 6}$$

$$d(f_i, f_j) = \|f_i - f_j\|_{l1/l2} \quad \text{Equation 7}$$

Where K denotes the number of ground truth instances in the scene; $\|\cdot\|$ is the $l_1$ norm; $\mu_i$ is the average of the segment features across the segments belonging to the ith instance; $d(f_i, f_j)$ indicates a suitable distance norm ($l_1/l_2$), $( \ldots )_+$ is the hinge loss, and $N_i$ is the number of voxels in the $i^{th}$ instance of the scene. Thus, Equation 4 brings segment features of the same instance closer to the centroid, Equation 5 repels centroid features of different instances, and Equation 6 regularizes loss.

Segment Fusion—Segment Loss

The SF-instance losses aid in clustering segment features appropriately. Relying solely on instance losses, however, may require iterative post-processing clustering algorithms such as kNN clustering, mean-shift clustering, and so forth. Technology described herein also places penalties on pairwise distances in the segment feature metric space, which in turn enables the use of a much simpler clustering solution to project features to labels. More particularly, embodiments use a loss function that focuses on fusable and separable edges independently (e.g., Equations 9, 10 and 11).

$$L_{segment} = w_{fuse}L_{fuse} + w_{sep}L_{sep} \quad \text{Equation 8}$$

$$L_{sep} = \frac{1}{|E_{sep}|}\sum_{e_{ij}\in E_{sep}}\left(\Delta_D - d(\overline{F}_\iota, \overline{F})\right)_+ \quad \text{Equation 9}$$

$$L_{fuse} = \frac{1}{|E_{fuse}|}\sum_{e_{ij}\in E_{fuse}}\left(d(\overline{F}_\iota, \overline{F}_j) - \Delta_D\right)_+ \quad \text{Equation 10}$$

Where $E_{sep}$ and $E_{fuse}$ denote the set of edges to be kept separate and fused respectively. Thus, Equation 9 penalizes edges where the model attempts to fuse incorrectly and Equation 10 penalizes edges where the model attempts to separate incorrectly. Since the number of separable edges far exceeds the number of fusable edges, higher overall mIoU (mean Intersection over Union, e.g., the Jaccard Index) is achieved by using a lower $w_{fuse}$ and $w_{sep}$. In one example, the values of $w_{fuse}$ and $w_{sep}$ are 1 and 0.01, respectively.

CCL

At the end of the pipeline, segment similarities are computed by calculating the Euclidean distance between the segment features. The segment similarities are also thresholded with a value ($\Delta_D$) (e.g., lower values indicating similar segments, and higher values indicating dissimilar segments). Similar segments that are spatially connected to one another are identified and grouped together by means of the CCL stage, where each group is identified as an instance. In one example, the CCL stage uses a Union-Find approach to efficiently compute the connected components, labelling each voxel with an instance ID. To obtain improved semantic segmentation performance, soft majority voting is performed by summing up the class probabilities of all the voxels in an instance and annotating the corresponding voxels with the maximum probable semantic class.

FIG. 5 shows a conventional classification result 70 in which an object (e.g., chair) is partially assigned Label A (e.g., chair) and Label B (e.g., stick). By contrast, an enhanced classification result 72 uses the technology described herein to label the object entirely with Label A (e.g., chair).

FIG. 6 shows a method 80 of segmenting a scene. The method 80 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Computer program code to carry out operations shown in the method 80 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 82 provides for identifying a plurality of segments based on semantic features, instance features, and point cloud data associated with a scene. In an embodiment, the plurality of segments is variable in size. Block 82 may involve using the geometric smoothness prior. Block 84 fuses the plurality of segments into a plurality of instances. In one example, block 84 fuses the plurality of segments into the plurality of instances via a learnable self-attention based network. Additionally, block 84 may fuse the plurality of segments into the plurality of instances based on an instance loss function, a segment loss function, and a distance margin parameter (e.g., ΔD). In such a case, the segment loss function may penalize fusion mispredictions and separation mispredictions with respect to pairs of segments. For example, in cases where two segments should be fused (e.g., determined from the ground-truth in the training set), but the model predicts a high distance between the segments (e.g., basically predicting that these segments should be kept separate), the loss function attempts to penalize such instances by detecting those scenarios (and the inverse scenario, join×fuse) and attaching a higher penalty to them (indicated by the hinge loss equations). Since the system is learnable, this loss is backpropagated through error gradients to update the weights of the segment-fusion network currently being trained. In cases where both the model and the ground truth agree, the hinge loss ensures that there is no penalty associated with such pairs of segments. In an embodiment, the updated weights perform better during an inference/test on an unseen data.

Block 86 selects classification labels for the plurality of instances. The method 80 therefore enhances performance at least to the extent that combining semantic features and instance features with hierarchical fusion (e.g., segments, instances) eliminates partial misclassification of objects, enables simpler post-processing, increases the ability to generalize across other models/networks and/or improves scalability for arbitrary scenes.

FIG. 7 shows a method 90 of selecting classification labels for a plurality of instances (e.g., soft majority voting). The method 90 may generally be incorporated into block 86 (FIG. 6), already discussed. More particularly, the method 90 may be implemented in one or more modules as a set of logic instructions stored in a machine- or computer-readable storage medium RAM, ROM, PROM, firmware, flash memory, etc., in hardware, or any combination thereof. For example, hardware implementations may include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Illustrated processing block 92 provides for generating, on a per instance basis, a semantic label for each voxel in the instance. Additionally, block 94 may select (e.g., via soft majority vote) a classification label based on semantic labels of voxels in the instance. The method 90 therefore further enhances performance by providing the ability to capture weaker but important clues in the scene.

Figure 8:
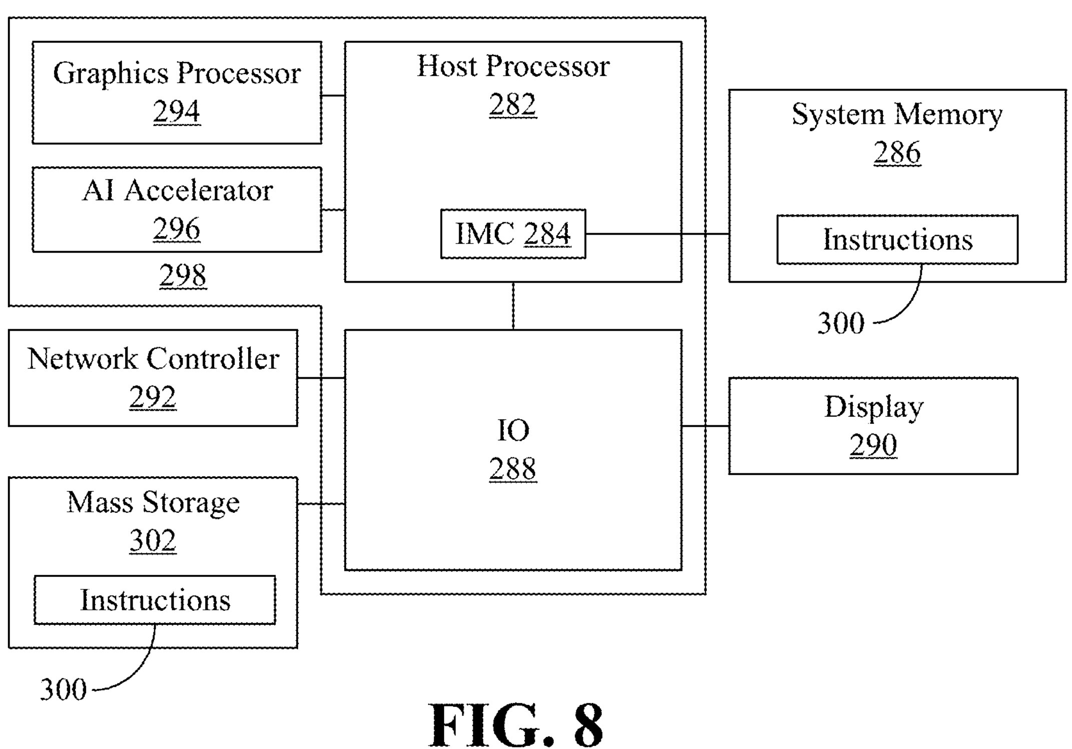
FIG. 8 is a block diagram of an example of a performance-enhanced computing system according to an embodiment.

Turning now to FIG. 8, a performance-enhanced computing system 280 is shown. The system 280 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 280 includes a host processor 282 (e.g., CPU) having an integrated memory controller (IMC) 284 that is coupled to a system memory 286 (e.g., dual inline memory module/DIMM). In an embodiment, an IO (input/output) module 288 is coupled to the host processor 282. The illustrated IO module 288 communicates with, for example, a display 290 (e.g., touch screen, liquid crystal display/LCD, light emitting diode/LED display), and a network controller 292 (e.g., wired and/or wireless). The host processor 282 may be combined with the IO module 288, a graphics processor 294, and an AI accelerator 296 into a system on chip (SoC) 298. In one example, the network controller 292 obtains data corresponding to a scene such as, for example, a 3D scene in an autonomous driving and/or robotics setting.

In an embodiment, the host processor 282 executes a set of program instructions 300 retrieved from mass storage 302 and/or the system memory 286 to perform one or more aspects of the method 80 (FIG. 6) and/or the method 90 (FIG. 7), already discussed. Thus, execution of the illustrated instructions 300 by the host processor 282 causes the host processor 282 to identify a plurality of segment based on semantic features and instance features associated with the scene, fuse the plurality of segments into a plurality of instances, and select classification labels for the plurality of instances. Additionally, the AI accelerator 296 may include configurable and/or fixed-functionality logic to perform one or more aspects of the method 80 (FIG. 6) and/or the method 90 (FIG. 7), already discussed. In one example, the computing system 280 is end-to-end learnable (e.g., due to the use of a learnable self-attention based network). The computing system 280 is therefore considered performance-enhanced at least to the extent that combining semantic features and instance features with hierarchical fusion (e.g., segments, instances) eliminates partial misclassification of objects, enables simpler post-processing, increases the ability to generalize across other models/networks and/or improves scalability for arbitrary scenes.

Figure 9:
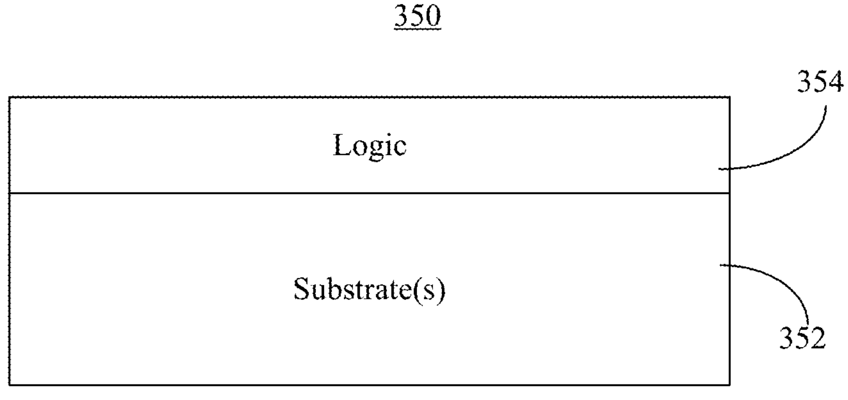
FIG. 9 is an illustration of an example of a semiconductor package apparatus according to an embodiment.

FIG. 9 shows a semiconductor apparatus 350 (e.g., chip, die, package). The illustrated apparatus 350 includes one or more substrates 352 (e.g., silicon, sapphire, gallium arsenide) and logic 354 (e.g., transistor array and other integrated circuit/IC components) coupled to the substrate(s) 352. In an embodiment, the logic 354 implements one or more aspects of the method 80 (FIG. 6) and/or the method 90 (FIG. 7), already discussed.

The logic 354 may be implemented at least partly in configurable or fixed-functionality hardware. In one example, the logic 354 includes transistor channel regions that are positioned (e.g., embedded) within the substrate(s) 352. Thus, the interface between the logic 354 and the substrate(s) 352 may not be an abrupt junction. The logic 354 may also be considered to include an epitaxial layer that is grown on an initial wafer of the substrate(s) 352.

Figure 10:
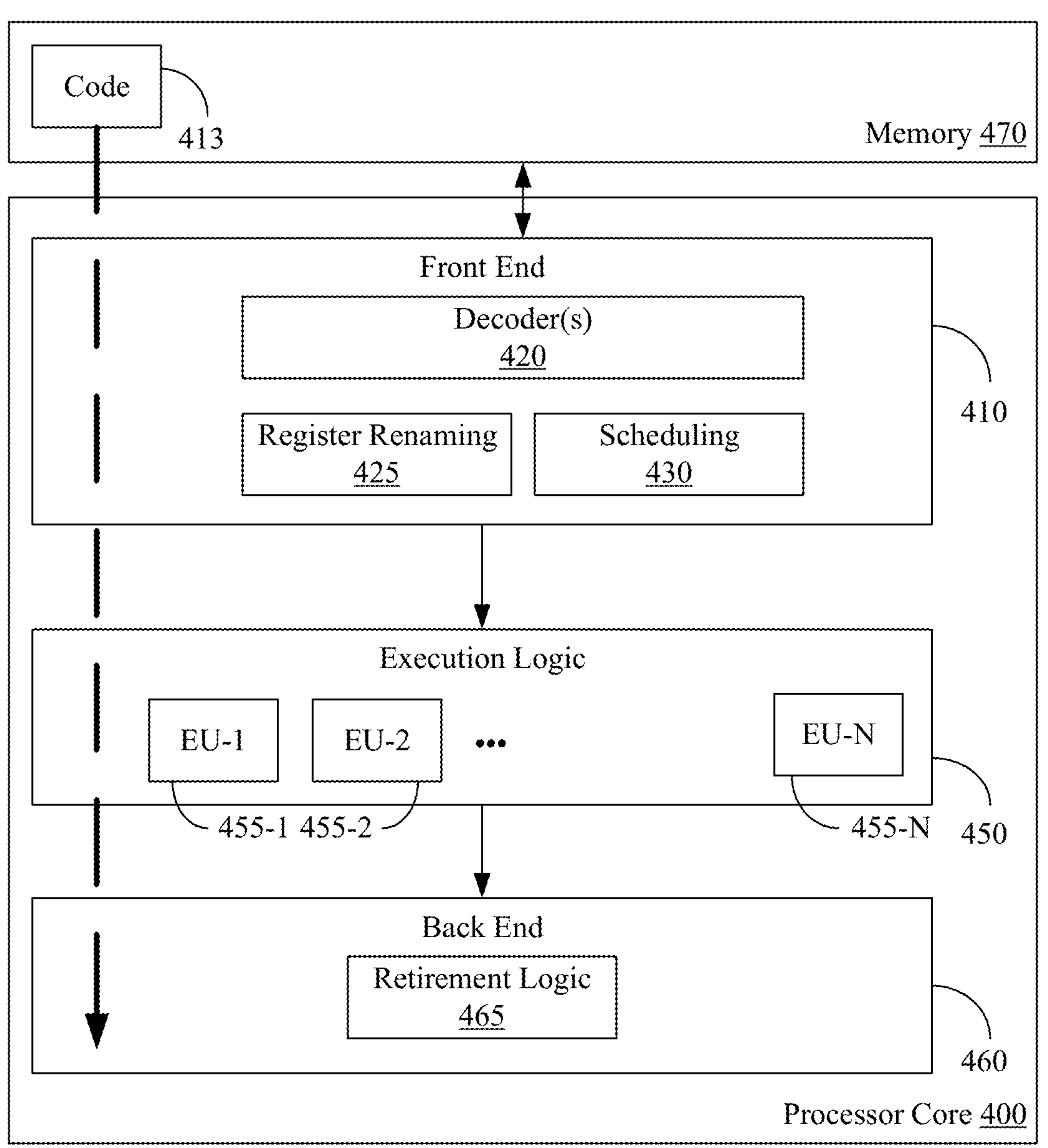
FIG. 10 is a block diagram of an example of a processor according to an embodiment.

FIG. 10 illustrates a processor core 400 according to one embodiment. The processor core 400 may be the core for any type of processor, such as a micro-processor, an embedded processor, a digital signal processor (DSP), a network processor, or other device to execute code. Although only one processor core 400 is illustrated in FIG. 10, a processing element may alternatively include more than one of the processor core 400 illustrated in FIG. 10. The processor core 400 may be a single-threaded core or, for at least one embodiment, the processor core 400 may be multithreaded in that it may include more than one hardware thread context (or "logical processor") per core.

FIG. 10 also illustrates a memory 470 coupled to the processor core 400. The memory 470 may be any of a wide variety of memories (including various layers of memory hierarchy) as are known or otherwise available to those of skill in the art. The memory 470 may include one or more code 413 instruction(s) to be executed by the processor core 400, wherein the code 413 may implement the method 80 (FIG. 6) and/or the method 90 (FIG. 7), already discussed. The processor core 400 follows a program sequence of instructions indicated by the code 413. Each instruction may enter a front end portion 410 and be processed by one or more decoders 420. The decoder 420 may generate as its output a micro operation such as a fixed width micro operation in a predefined format, or may generate other instructions, microinstructions, or control signals which reflect the original code instruction. The illustrated front end portion 410 also includes register renaming logic 425 and scheduling logic 430, which generally allocate resources and queue the operation corresponding to the convert instruction for execution.

The processor core 400 is shown including execution logic 450 having a set of execution units 455-1 through 455-N. Some embodiments may include a number of execution units dedicated to specific functions or sets of functions. Other embodiments may include only one execution unit or one execution unit that can perform a particular function. The illustrated execution logic 450 performs the operations specified by code instructions.

After completion of execution of the operations specified by the code instructions, back end logic 460 retires the instructions of the code 413. In one embodiment, the processor core 400 allows out of order execution but requires in order retirement of instructions. Retirement logic 465 may take a variety of forms as known to those of skill in the art (e.g., re-order buffers or the like). In this manner, the processor core 400 is transformed during execution of the code 413, at least in terms of the output generated by the decoder, the hardware registers and tables utilized by the register renaming logic 425, and any registers (not shown) modified by the execution logic 450.

Although not illustrated in FIG. 10, a processing element may include other elements on chip with the processor core 400. For example, a processing element may include memory control logic along with the processor core 400. The processing element may include I/O control logic and/or may include I/O control logic integrated with memory control logic. The processing element may also include one or more caches.

Figure 11:
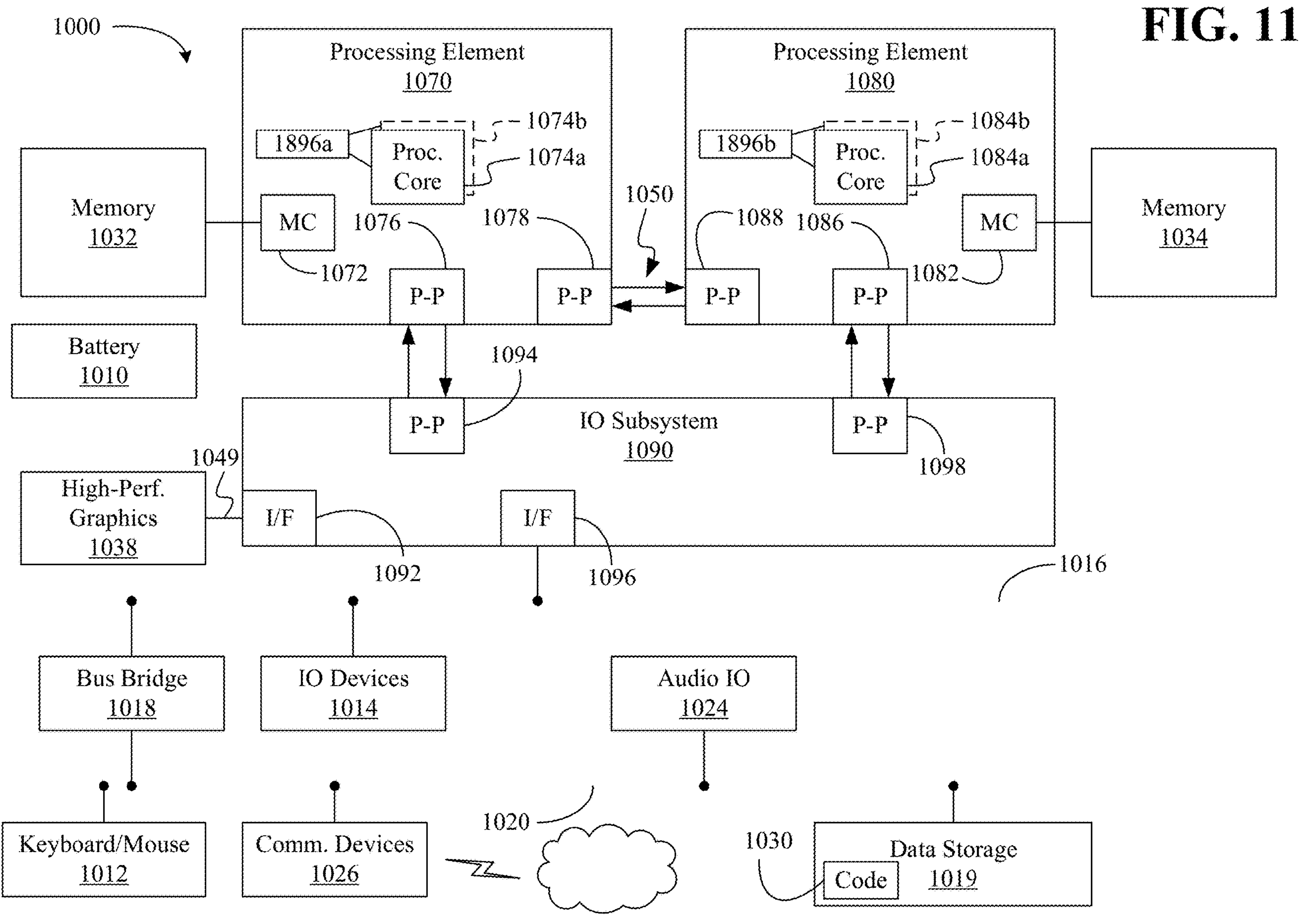
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 10.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 80 (FIG. 6) and/or the method 90 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 includes a performance-enhanced computing system comprising a network controller to obtain data corresponding to a scene, a processor coupled to the network controller, and a memory including a set of instructions, which when executed by the processor, cause the processor to identify a plurality of segments based on semantic features and instance features associated with the scene, fuse the plurality of segments into a plurality of instances, and select classification labels for the plurality of instances.

Example 2 includes the computing system of Example 1, wherein the plurality of segments is to be fused into the plurality of instances via a learnable self-attention based network, and wherein the computing system is end-to-end learnable.

Example 3 includes the computing system of Example 1, wherein the plurality of segments is to be fused into the plurality of instances based on an instance loss function, a segment loss function, and a distance margin parameter.

Example 4 includes the computing system of Example 3, wherein the segment loss function is to penalize fusion mispredictions and separation mispredictions.

Example 5 includes the computing system of Example 1, wherein to select the classification labels, the instructions, when executed, further cause the processor to generate, on a per instance basis, a semantic label for each voxel in the instance, and select the classification label based on semantic labels of voxels in the instance.

Example 6 includes the computing system of any one of Examples 1 to 5, wherein the plurality of segments is to be variable in size.

Example 7 includes at least one computer readable storage medium comprising a set of instructions, which when executed by a computing system, cause the computing system to identify a plurality of segments based on semantic features, instance features and point cloud data associated with a scene, fuse the plurality of segments into a plurality of instances, and select classification labels for the plurality of instances.

Example 8 includes the at least one computer readable storage medium of Example 7, wherein the plurality of segments is to be fused into the plurality of instances via a learnable self-attention based network.

Example 9 includes the at least one computer readable storage medium of Example 7, wherein the plurality of segments is to be fused into the plurality of instances based on an instance loss function, a segment loss function, and a distance margin parameter.

Example 10 includes the at least one computer readable storage medium of Example 9, wherein the segment loss function is to penalize fusion mispredictions and separation mispredictions.

Example 11 includes the at least one computer readable storage medium of Example 7, wherein to select the classification labels, the instructions, when executed, further cause the computing system to generate, on a per instance basis, a semantic label for each voxel in the instance, and select the classification label based on semantic labels of voxels in the instance.

Example 12 includes the at least one computer readable storage medium of any one of Examples 7 to 11, wherein the plurality of segments is to be variable in size.

Example 13 includes a semiconductor apparatus comprising one or more substrates, and logic coupled to the one or more substrates, wherein the logic is implemented at least partly in one or more of configurable or fixed-functionality hardware, the logic to identify a plurality of segments based on semantic features, instance features and point cloud data associated with a scene, fuse the plurality of segments into a plurality of instances, and select classification labels for the plurality of instances.

Example 14 includes the semiconductor apparatus of Example 13, wherein the plurality of segments is to be fused into the plurality of instances via a learnable self-attention based network.

Example 15 includes the semiconductor apparatus of Example 13, wherein the plurality of segments is to be fused into the plurality of instances based on an instance loss function, a segment loss function, and a distance margin parameter.

Example 16 includes the semiconductor apparatus of Example 15, wherein the segment loss function is to penalize fusion mispredictions and separation mispredictions.

Example 17 includes the semiconductor apparatus of Example 13, wherein to select the classification labels, the logic is to generate, on a per instance basis, a semantic label for each voxel in the instance, and select the classification label based on semantic labels of voxels in the instance.

Example 18 includes the semiconductor apparatus of any one of Examples 13 to 17, wherein the plurality of segments is to be variable in size.

Example 19 includes the semiconductor apparatus of any one of Examples 13 to 18, wherein the logic coupled to the one or more substrates includes transistor channel regions that are positioned within the one or more substrates.

Example 20 includes a method of operating a performance-enhanced computing system, the method comprising identifying a plurality of segments based on semantic features, instance features and point cloud data associated with a scene, fusing the plurality of segments into a plurality of instances, and selecting classification labels for the plurality of instances.

Example 21 includes the method of Example 20, wherein the plurality of segments is fused into the plurality of instances via a learnable self-attention based network.

Example 22 includes the method of Example 20, wherein the plurality of segments is fused into the plurality of instances based on an instance loss function, a segment loss function, and a distance margin parameter.

Example 23 includes the method of Example 22, wherein the segment loss function penalizes fusion mispredictions and separation mispredictions.

Example 24 includes the method of Example 20, wherein selecting the classification labels includes generating, on a per instance basis, a semantic label for each voxel in the instance, and selecting the classification label based on semantic labels of voxels in the instance.

Example 25 includes the method of any one of Examples 20 to 24, wherein the plurality of segments is variable in size.

Example 26 includes an apparatus comprising means for performing the method of any one of Examples 20 to 25.

Thus, technology described herein helps to quantitatively improve semantic segmentation performance. The technology also helps in qualitatively improving the semantic segmentation performance of 3D scenes. Moreover, the technology is learnable, and therefore applicable on a variety of backbone networks. Indeed, the technology is agnostic to the choice of semantic and instance segmentation backbones since the technology primarily depends upon consensus of predictions in a segment. The backbones may experience improved performance even though the backbones may have different base semantic segmentation performance. This advantage also enables the possibility of end-to-end trainable networks.

Additionally, the technology is simple, yet clusters effectively. SF-instance losses aid in clustering segment features but relying solely on instance losses may require iterative (e.g., and non-learnable) post-processing clustering algorithms (e.g., such as mean-shift clustering) that perform analysis on segments to group the segments. To simplify the grouping process, the proposed SF-segment losses focus on pairwise distances between nodes in the graph. This approach enables simple thresholding and a CCL stage to form groups of segments. Keeping the clustering simple enables the learnable framework to learn how to discriminate between nodes, reducing dependency on heuristic-based clustering.

The technology described herein is also quantitatively better than non-learnable clustering. Segment-Fusion performs better than conventional iterative clustering solutions in semantic segmentation when applied to different semantic backbones. Indeed, the technology improves generalizability across datasets.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
- a network controller to obtain data corresponding to a scene;
- a processor coupled to the network controller; and
- a memory including a set of instructions, which when executed by the processor, cause the processor to:
  - use a first neural network to generate semantic features,
  - use a second neural network to generate instance features,
  - identify a plurality of segments using a graph clusterer based on the semantic features, the instance features, and point cloud data associated with the scene,
  - fuse the plurality of segments into a plurality of instances, wherein the plurality of segments is to be fused into the plurality of instances via a learnable self-attention based network, and
  - select classification labels for the plurality of instances.

2. The computing system of claim 1, wherein the computing system is end-to-end learnable.

3. The computing system of claim 1, wherein the plurality of segments is to be fused into the plurality of instances based on an instance loss function, a segment loss function, and a distance margin parameter.

4. The computing system of claim 3, wherein the segment loss function is to penalize fusion mispredictions and separation mispredictions.

5. The computing system of claim 1, wherein to select the classification labels, the instructions, when executed, further cause the processor to:
- generate, on a per instance basis, a semantic label for each voxel in the instance, and
- select the classification label based on semantic labels of voxels in the instance.

6. The computing system of claim 1, wherein the plurality of segments is to be variable in size.

7. At least one non-transitory computer readable storage medium comprising a set of instructions, which when executed by a computing system, cause the computing system to:
- use a first neural network to generate semantic features;
- use a second neural network to generate instance features;
- identify a plurality of segments using a graph cluster based on the semantic features, the instance features, and point cloud data associated with a scene;
- fuse the plurality of segments into a plurality of instances, wherein the plurality of segments is to be fused into the plurality of instances via a learnable self-attention based network; and
- select classification labels for the plurality of instances.

8. The at least one non-transitory computer readable storage medium of claim 7, wherein the plurality of segments is to be fused into the plurality of instances based on an instance loss function, a segment loss function, and a distance margin parameter.

9. The at least one non-transitory computer readable storage medium of claim 8, wherein the segment loss function is to penalize fusion mispredictions and separation mispredictions.

10. The at least one non-transitory computer readable storage medium of claim 7, wherein to select the classification labels, the instructions, when executed, further cause the computing system to:
- generate, on a per instance basis, a semantic label for each voxel in the instance; and
- select the classification label based on semantic labels of voxels in the instance.

11. The at least one non-transitory computer readable storage medium of claim 7, wherein the plurality of segments is to be variable in size.

12. A semiconductor apparatus comprising:
- one or more substrates; and
- logic coupled to the one or more substrates, wherein the logic is implemented at least partly in one or more of configurable or fixed-functionality hardware, the logic to:
  - use a first neural network to generate semantic features,
  - use a second neural network to generate instance features,
  - identify a plurality of segments using a graph clusterer based on the semantic features, the instance features, and point cloud data associated with a scene,
  - fuse the plurality of segments into a plurality of instances, wherein the plurality of segments is to be fused into the plurality of instances via a learnable self-attention based network, and
  - select classification labels for the plurality of instances.

13. The semiconductor apparatus of claim 12, wherein the plurality of segments is to be fused into the plurality of instances based on an instance loss function, a segment loss function, and a distance margin parameter.

14. The semiconductor apparatus of claim 13, wherein the segment loss function is to penalize fusion mispredictions and separation mispredictions.

15. The semiconductor apparatus of claim 12, wherein to select the classification labels, the logic is to:
- generate, on a per instance basis, a semantic label for each voxel in the instance; and select the classification label based on semantic labels of voxels in the instance.

16. The semiconductor apparatus of claim 12, wherein the plurality of segments is to be variable in size.

17. The semiconductor apparatus of claim 12, wherein the logic coupled to the one or more substrates includes transistor channel regions that are positioned within the one or more substrates.

18. A method comprising:

using a first neural network to generate semantic features, using a second neural network to generate instance features, identifying a plurality of segments using a graph cluster based on the semantic features, the instance features, and point cloud data associated with a scene;

fusing the plurality of segments into a plurality of instances, wherein the plurality of segments is fused into the plurality of instances via a learnable self-attention based network; and selecting classification labels for the plurality of instances.

19. The method of claim 18, wherein the plurality of segments is fused into the plurality of instances based on an instance loss function, a segment loss function, and a distance margin parameter.

20. The method of claim 19, wherein the segment loss function penalizes fusion mispredictions and separation mispredictions.

21. The method of claim 18, wherein selecting the classification labels includes:

generating, on a per instance basis, a semantic label for each voxel in the instance; and selecting the classification label based on semantic labels of voxels in the instance.

22. The method of claim 18, wherein the plurality of segments is variable in size.

* * * * *